(12) United States Patent
Espeseth et al.

(10) Patent No.: US 7,376,784 B2
(45) Date of Patent: May 20, 2008

(54) SYSTEM AND METHOD FOR SELECTING COMMAND FOR EXECUTION IN HDD BASED ON BENEFIT

(75) Inventors: Adam Michael Espeseth, Rochester, MN (US); Robert Anton Steinbach, East Bethel, MN (US); Trevor James Briggs, Rochester, MN (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 592 days.

(21) Appl. No.: 10/764,946

(22) Filed: Jan. 26, 2004

(65) Prior Publication Data

US 2005/0166013 A1  Jul. 28, 2005

(51) Int. Cl.
*G06F 12/06* (2006.01)
*G06F 12/16* (2006.01)
*G06F 12/10* (2006.01)

(52) U.S. Cl. .................. 711/112; 711/114; 711/137
(58) Field of Classification Search ............. None
See application file for complete search history.

(56) References Cited

U.S. PATENT DOCUMENTS

| | | | |
|---|---|---|---|
| 3,623,006 A | 11/1971 | Balakian et al. ......... 340/172.5 |
| 5,455,934 A | 10/1995 | Holland et al. ............. 395/404 |
| 5,570,332 A * | 10/1996 | Heath et al. ............... 369/30.1 |
| 5,991,825 A | 11/1999 | Ng ................................. 710/6 |
| 6,195,222 B1 | 2/2001 | Heminger et al. ....... 360/78.07 |
| 6,463,346 B1 | 10/2002 | Flockhart et al. ........... 700/102 |
| 6,571,298 B1 | 5/2003 | Megiddo ....................... 710/5 |
| 6,574,676 B1 * | 6/2003 | Megiddo ....................... 710/5 |
| 6,578,107 B1 * | 6/2003 | Anderson et al. ........... 711/113 |
| 6,658,535 B1 * | 12/2003 | Megiddo et al. ............ 711/137 |
| 6,721,845 B1 * | 4/2004 | Clegg et al. ................. 711/114 |
| 6,725,327 B1 * | 4/2004 | Espeseth et al. ............ 711/112 |
| 6,925,526 B2 * | 8/2005 | Hall ............................ 711/113 |
| 2001/0020260 A1 | 9/2001 | Kanamaru et al. ............. 711/4 |
| 2002/0108016 A1 * | 8/2002 | Haines et al. ............... 711/112 |
| 2003/0074526 A1 | 4/2003 | Kanamaru et al. .......... 711/113 |
| 2003/0158996 A1 | 8/2003 | Epeseth et al. ............. 711/112 |
| 2003/0182499 A1 * | 9/2003 | Espeseth et al. ............ 711/112 |

FOREIGN PATENT DOCUMENTS

JP 2276083 11/1990
JP 6259198 9/1994

* cited by examiner

*Primary Examiner*—Hyung S. Sough
*Assistant Examiner*—Duc Tich Doan
(74) *Attorney, Agent, or Firm*—John L. Rogitz

(57) ABSTRACT

Commands in a queue in a hard disk drive (HDD) are selected based on a benefit of providing either an optimized throughput or an optimized number of commands per second execution, as opposed to a simple shortest access time first (SATF) selection method.

11 Claims, 1 Drawing Sheet

SYSTEM AND METHOD FOR SELECTING COMMAND FOR EXECUTION IN HDD BASED ON BENEFIT

I. FIELD OF INVENTION

The present invention relates to hard disk drives.

II. BACKGROUND OF THE INVENTION

When a hard disk drive (HDD) has more than one command to execute, the commands are placed in a queue from which the next command is chosen. A Rotational Position Optimization (RPO) algorithm is used to reorder the commands for execution. Presently, hard disk drives use a Shortest Access Time First (SATF) RPO algorithm to determine which command to select. This algorithm works as follows: given a set of commands in a queue, choose the command that can be started (accessed) first. This calculation has two parts, namely, the time to perform the seek and settle operation from the current cylinder to the target cylinder, and the latency (also referred to as "extra time" herein) between this point and the starting sector for the command. Together these parts make up the estimated access time (EAT) for each queued command. The SATF algorithm depends on accurate estimates of the access time. If the estimate is too low, the actuator may settle on track after the desired sector has passed rotationally resulting in a 'miss' which adds one full revolution to the access time and, thus, degrading performance. On the other hand, if the estimate is too high, the optimal command candidate is not chosen for execution.

In any case, a SATF RPO algorithm simply selects the command which can be started first. As critically recognized herein, the SATF algorithm does not account for the length (in blocks) of queue candidates or the fact that certain queue candidates may be linked sequentially to other commands that can be executed in one disk operation. Instead, the SATF algorithm simply compares the estimated access times of each command in the queue and selects the command with the lowest EAT for execution. As recognized by the present invention, this can result in non-optimal data throughput and the failure to execute an optimal number of commands per second.

More specifically, the present invention understands that in workloads that contain a mixture of random and semi-sequential accesses, the SATF algorithm may not select commands that result in the highest rate of operations per second, because the SATF algorithm will attempt to minimize access times only. Consequently, it will not lend weight to a command that has a pipe of sequential commands, such as LBA-sequential commands that might be received sequentially by the drive and which consequently lend themselves to the execution of multiple commands in one operation. As recognized above, however, a SATF algorithm does not exploit this feature, instead attempting only to minimize the next access time. That is, a SATF algorithm will select a long sequential pipe of commands only if it has the shortest access time of all random accesses currently in the queue.

The present invention still further recognizes that for a random or semi-sequential workload that contains a mixture of transfer lengths, a SATF algorithm does not lend weight to commands that have longer transfer lengths, which could otherwise optimize throughput. Accordingly, a SATF algorithm cannot directly optimize either metric, i.e., it cannot optimize throughput or operations per second.

SUMMARY OF THE INVENTION

According to the present invention, two new RPO cost functions are provided that optimize either operations per second or throughput, respectively by accounting for the command length and sequential pipe. By "pipe" is meant a list of commands that pertain to blocks that have sequential logical block addresses (LBAs) to one another. The command with the highest throughput benefit or operation rate benefit is selected for execution. Which cost function to use can be specified by a customer using, e.g., a vendor-unique mode page byte.

Accordingly, in a first aspect a hard disk drive (HDD) includes at least one rotatable disk and at least one data transfer element. A HDD controller controls the data transfer element to execute commands in a queue, with a command being selected for execution based on at least one of: an optimized throughput benefit, and an optimized operation rate benefit.

In a preferred embodiment, the throughput benefit is determined based at least in part on a pipe length and more specifically is equal to a pipe length (in blocks) divided by the sum of a pipe length (in servo identification (SID) marks), a seek time, an extra time, and a probability of missing the desired I/O location thus requiring an extra disk revolution. On the other hand, the operation rate benefit is determined based at least in part on a number of commands in a pipe to be executed, and more specifically can be equal to a number of commands to be executed divided by the sum of a pipe length, a seek time, an extra time, and a miss probability.

In another aspect, a hard disk drive controller executes logic that includes receiving a user selection of throughput optimization or operations per second optimization, and in response to a selection of throughput optimization, determining a next command to execute in a queue of commands by dividing a pipe length by the sum of a pipe length and at least one time period and at least one probability. The logic also includes, in response to a selection of operations per second optimization, determining a next command to execute in a queue of commands by dividing a number of commands in a pipe by the sum of a pipe length and at least one time period and at least one probability.

In another aspect, a HDD includes at least one disk and a controller writing data to and reading data from the disk in response to commands in a queue. The controller determines a command to execute by invoking either means for determining a throughput benefit associated with executing each command, or means for determining an operational rate benefit associated with executing each command.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
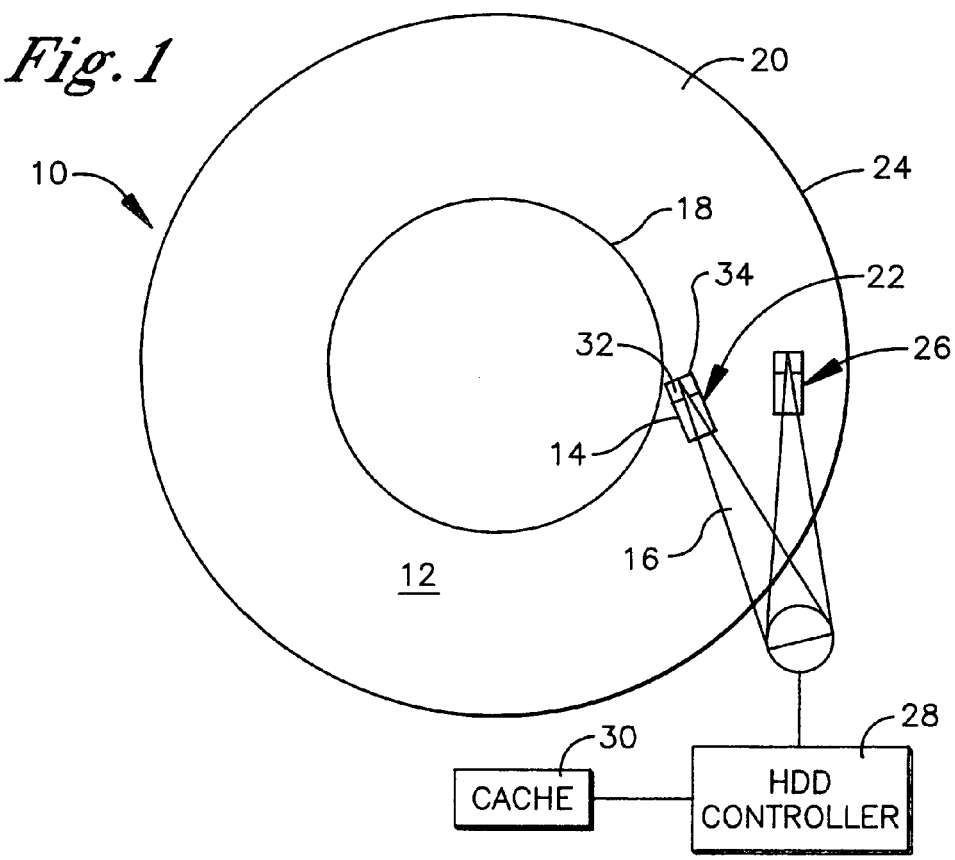
FIG. 1 is a schematic view of the hard disk drive, showing the actuator arm near the inner diameter (ID) and the outer diameter (OD) of the disk.

Referring initially to FIG. 1, a data storage system is shown, generally designated 10, which includes one or more (only one shown for clarity) rotatable hard disks 12 onto which data can be written and from which data can be read by a read/write head 14 that is mounted on an actuator arm 16 for movement of the head 14 over the disk 12 between an inner diameter (ID) 18 of a data storage area 20 of the disk 12 (indicated at position 22 of the head 14) and an outer diameter 24 of the storage area 20 (indicated at position 26 of the head 14). The head 14 and actuator 16 may be controlled by a processor such as a hard disk drive (HDD) controller 28, which executes the below-described logic in accordance with present principles. The controller 28 may also access a solid state data cache or buffer 30.

In accordance with HDD principles known in the art and as figuratively shown in FIG. 1, the head 14 may include a write element 32 and a read element 34. The head 14 may be configured for longitudinal recording or for perpendicular recording.

Figure 2:
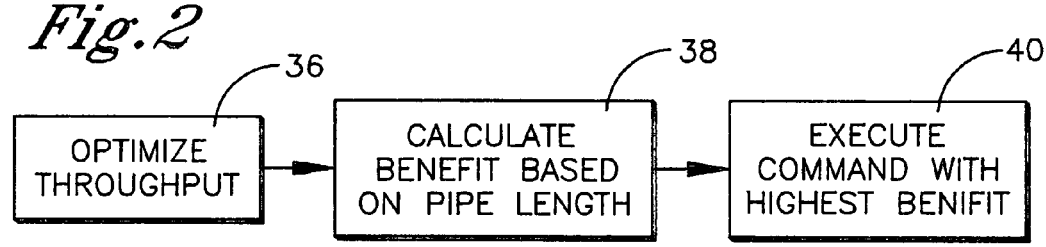
FIG. 2 is a flow chart of the logic for determining a benefit for optimizing throughput to determine which command to execute.
Figure 3:
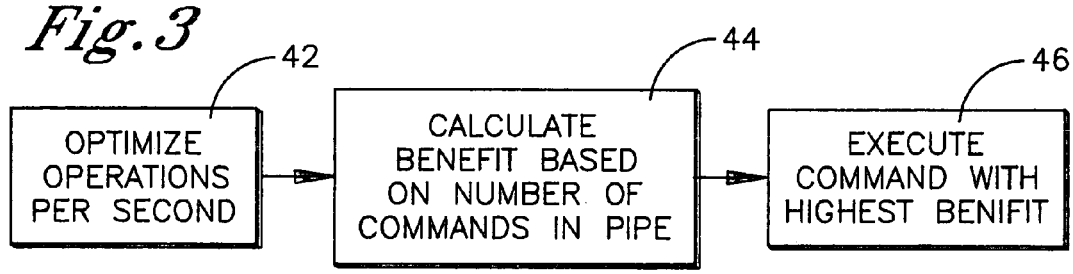
FIG. 3 is a flow chart of the logic for determining a benefit for optimizing the number of commands per second to determine which command to execute.

FIGS. 2 and 3 show the logic that is followed by the HDD controller 28 for optimizing throughput and operation rate, respectively, as selected by the user. As used herein, a "pipe" refers to a sequence of related commands in the queue of the controller 28, i.e., a sequence of commands that pertain to blocks which are linked by being in a logical block address (LBA) sequence.

Commencing at state 36 in FIG. 3, which indicates that the user has selected data throughput optimization, the logic moves to block 38 to calculate, for each command in the queue of the controller 28, a benefit for optimizing data throughput in megabytes (MB) per second using a pipe length. With more specificity, if more than one command exists in a pipe, only a single command from the pipe is tested; commands pertaining to isolated blocks are treated separately. For example, consider the following commands with associated blocks:

Command A: starting LBA=0, length=10
Command B: starting LBA=10, length=8
Command C: starting LBA=18, length=1
Command D: starting LBA=100, length=1

In the above example, commands A, B, and C are linked in that they pertain to a sequence of LBAs from 0 to 19. They are treated as a single command in the logic below, with a pipe length of 19 and a number of commands equal to three. Command D, on the other hand, is treated as a separate random access because it is not linked with any other command. The logic below selects from the above two choices in ordering requests, i.e., whether to execute Commands A-C before Command D.

The throughput benefit provided by each command in the queue is determined by:

$$\text{Benefit}=(\text{pipe\_length}_1)/(\text{seek\_time}+\text{extra time}+P(\text{miss in 1 rev})(\text{penalty})+\text{pipe length}_2), \text{ wherein}$$

pipe_length$_1$, is the length (in total number of blocks) of the sequential pipe of commands in the queue that are related to the command under test, i.e., the length (in blocks) of the commands that have logical block addresses (LBA) sequentially after the command under test and, hence, are in the same "pipe" as the command under test;

pipe_length$_2$ is the length of the pipe under test but in units of rotational time, e.g., in Servo identifications (SIDs);

P(miss in 1 rev) is the probability of a "miss" which would require another disk rotation to execute the command;

in the preferred embodiment P(miss in 1 rev) can be obtained from a DEAT lookup table as disclosed in U.S. patent application Ser. No. 09/638,253, filed Aug. 14, 2000 and incorporated herein by reference;

penalty=time penalty of one revolution (time it takes the disk to revolve once); and seek_time and extra_time are determined using SATF principles, e.g., using the SATF principles set forth in the above-referenced patent publication. If desired, seek_time, extra_time, and pipe_length can be measured in the same units, e.g., units of sector IDs.

The command with the highest throughput benefit score is executed at block 40.

In contrast, when the user has selected to optimize operation rate as indicated at block 42 of FIG. 3, the logic moves to block 44 to calculate, for each command in the queue of the controller 28, a benefit for maximizing the number of read and write operations per second using a number of commands extant in the queue. With more specificity, the operation rate benefit provided by each command in the queue is determined by:

$$\text{Benefit}=(\text{num\_cmds\_in\_pipe})/(\text{seek\_time}+\text{extra time}+P(\text{miss in 1 rev})*(\text{penalty})+\text{pipe length}_2),$$
wherein the variables are defined as above, and wherein num_cmds_in_pipe=the number of commands in the pipe of commands that is associated with the command under test.

The command with the highest benefit score is executed at block 46.

While the particular SYSTEM AND METHOD FOR SELECTING COMMAND FOR EXECUTION IN HDD BASED ON BENEFIT as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for" or, in the case of a method claim, the element is recited as a "step" instead of an "act". Absent express definitions herein, claim terms are to be given all ordinary and accustomed meanings that are not irreconcilable with the present specification and file history.

We claim:
1. A method for a hard disk drive controller, the method comprising:
   receiving a user selection of a throughput optimization and/or an optimization based on number of operations per second;
   in response to a selection of throughput optimization, determining at least one next command to execute in a queue of commands by determining a pipe length and dividing the pipe length by the sum of a pipe length, at least one time period, and at least one probability; and in response to a selection of the optimization based on number of operations per second, determining a next command to execute in a queue of commands by determining a number of commands in a pipe and dividing the product by the sum of a pipe length, at least one time period, and at least one probability, wherein the next command is accessed for execution.

2. The method of claim 1, wherein the at least one time period is the sum of a seek time, and an extra time.

3. The method of claim 1, wherein the probability represents a miss probability.

4. A Hard Disk Drive (HHD) comprising:
   at least one disk;
   a controller writing data to and reading data from the disk in response to commands in a queue, the controller determining a command to execute by invoking at least one of:
   means for determining a throughput benefit associated with executing each command; or
   means for determining an operational rate benefit associated with executing each command, wherein the means fly determining a throughput benefit uses a pipe length in a numerator and in a denominator of a quotient in a way that the pipe length in the numerator does not cancel the pipe length in the denominator.

5. The HDD of claim 4, wherein the means for determining a throughput benefit determines the pipe length and divides the pipe length by the sum of a pipe length and at least one time period and at least one probability.

6. The HDD of claim 5, wherein the at least one time period is the sum of a seek time, and an extra time.

7. The HDD of claim 5, wherein a pipe length is a length of the sequential pipe of commands in at least one of: servo identifications (SIDs), and number of blocks in a pipe.

8. The HDD of claim 4, wherein the means for determining an operational rate benefit uses a number of commands in a pipe in a numerator and a pipe length in the denominator of a quotient.

9. The HDD of claim 8, wherein the means for determining an operational rate benefit divides the number of commands by the sum of the pipe length and at least one time period and at least one probability.

10. The HDD of claim 9, wherein the at least one time period is the sum of a seek time, and an extra time.

11. The HDD of claim 9, wherein the probability represents a miss probability.

* * * * *